United States Patent [19]

Gabillet

[11] Patent Number: 4,649,469

[45] Date of Patent: Mar. 10, 1987

[54] INTERFACE FOR CONNECTING A COMPUTER SYSTEM TO AN ACTIVATOR MODULE

[75] Inventor: Jean-Francois Gabillet, Coye la Foret, France

[73] Assignee: Jeumont-Schneider Corporation, Puteaux, France

[21] Appl. No.: 575,860

[22] Filed: Feb. 1, 1984

[30] Foreign Application Priority Data

Feb. 3, 1983 [FR] France ............................. 83 01672

[51] Int. Cl.⁴ ..................... G05B 15/08; G05B 9/02; G06F 7/34; H02J 3/38
[52] U.S. Cl. .................................. 364/130; 364/186; 307/52; 371/68
[58] Field of Search .............. 264/130, 141, 184, 185, 264/186, 480, 492, 200, 900; 371/68, 66; 307/52, 219

[56] References Cited

U.S. PATENT DOCUMENTS

| | | | |
|---|---|---|---|
| 3,757,302 | 9/1973 | Pollitt | 371/66 |
| 3,931,502 | 1/1976 | Kohlas | 364/492 |
| 4,074,146 | 2/1978 | Buonavita | 307/52 |
| 4,149,069 | 4/1979 | Strelow | 371/68 |
| 4,292,544 | 9/1981 | Ishii et al. | 307/52 |
| 4,349,879 | 9/1982 | Peddie et al. | 307/52 |
| 4,371,908 | 2/1983 | Andow et al. | 364/480 X |
| 4,400,792 | 8/1983 | Strelow | 371/68 X |
| 4,409,635 | 10/1983 | Kraus | 364/186 X |
| 4,412,284 | 10/1983 | Kerforne et al. | 364/130 X |
| 4,442,521 | 4/1984 | Inaba et al. | 364/186 X |
| 4,455,652 | 6/1984 | van der Meulen | 364/186 X |

FOREIGN PATENT DOCUMENTS

| | | |
|---|---|---|
| 2850832 | 6/1980 | Fed. Rep. of Germany . |
| 2932270 | 12/1980 | Fed. Rep. of Germany . |
| 0154011 | 9/1983 | Japan ................................. 364/184 |

*Primary Examiner*—Jerry Smith
*Assistant Examiner*—Jon D. Grossman
*Attorney, Agent, or Firm*—Rines and Rines, Shapiro and Shapiro

[57] ABSTRACT

This invention is concerned with an interface for a computer system. This interface is characterized in such a way that it includes an assembly of elements (C2, C2') capable of performing an AND function, controlling modules (K1, K1') for monitoring the function of these elements (C2, C2'), the outputs of which modules are tied to a command system associated with the computer system D1, D1'), and means (K2, K2') to test the monitoring modules (K1, K1'), the command sytem being equipped with means to compare the states of the elements (C2, C2') that perform and AND function, as indicated by the control modules (K1, K1') with the command state. The warranting, means to inhibit the sending of a command signal is inhibited when the two states do not match. The invention is applicable to situations where a security interface is required.

18 Claims, 3 Drawing Figures

INTERFACE FOR CONNECTING A COMPUTER SYSTEM TO AN ACTIVATOR MODULE

This invention is concerned with an interface that connects a computer module to an activator that needs to be driven by electrical power supplied by means of a power circuit, the activating and de-activating switch of which is controlled by said computer module.

It is well known, for example, that in the case of control systems for railroad switches, for security reasons the activator of the switch is only powered up when certain specific conditions have been met. Each of these conditions is usually defined by the electrical state of a relay. When a relay is turned on, for example, it will initiate the opening or closing of a contact mounted in the power circuit of the electric motor that drives the activator.

These systems that are based on the use of relays present certain inefficiencies and inconveniences. Special security relays, i.e., relays that are equipped with their own intrinsic security features, have to be used so as to insure proper functioning of the elements of the system. These relays are relatively expensive. Furthermore, the systems that are based on these relays do not have the capability, except by complicated methods, to detect and eliminate defective or erroneous commands that might result, for example, from a short in the power circuit.

The object of this invention is to alleviate these inefficiencies and inconveniences.

In order to achieve this objective, the interface, in summary, in accordance with this invention, includes circuit elements that are capable of performing an AND logic function, a monitoring circuit arrangement that monitors the functioning of these circuit elements and has outputs tied to a controller circuit on the computer side, and means of testing this monitoring setup. The controller circuit on the computer side is equipped with a comparator circuit that checks the states of the logic circuit elements. This comparator circuit is responsive to an output of the monitoring circuit arrangement and to the existing command state. The controller circuit has signal inhibitors that prevent a command signal from being sent when the two compared command states don't match.

In practice of the invention, the circuit elements that perform the logic function can be off-the-shelf electrical or electronic components that have no specific security requirements, and at the same time are inexpensive, yet at the same time are able to guarantee the functional integrity of the interface.

According to an advantageous characteristic of the invention, the power circuit of the activator, which includes two lines that transmit electrical power at two different levels, has in at least one of these lines an element that can carry out an AND function, as well as act as a switch, so that transfer of power to the activator upon receipt of a command signal from the controller is accomplished, and further has a monitoring mechanism to check the output state of the AND element.

According to another advantageous characteristic of this invention, a circuit element capable of performing an AND logic function is mounted in each power transmission line of the activator's power circuit. Each such circuit element is controlled by an appropriate command mechanism from the controller. A monitoring circuit is also associated with each AND element, each monitoring circuit being equipped with means to monitor said element, and being in turn connected to the command mechanism for said element and/or another element.

According to another advantageous characteristic of this invention, the two transmission lines of the activator's power circuit are connected from the outputs of the logic elements to the inputs of the primary winding of a transformer, while the activator itself is hooked up to the circuit of the transformer's secondary winding.

According to another characteristic of the invention, each monitoring circuit is connected to a test circuit that provides a test signal at the inputs of the monitoring circuit. In response to the test signal the monitoring circuit generates an output signal as if a power level where present at the output of the AND element.

According to this invention it is possible to employ a transformer that is characterized by a perceptible rectangular hysteresis curve. The transformer primary winding is designed so that the current that flows in a direction that is inversely related to the function of the command signals that are applied to the AND elements power transmission lines of the activator, in such a way that there is no power transmission in the secondary circuit of the transformer wherever there is a constant voltage applied to at least one of the power lines.

The invention will be more easily understood, and the other objectives, characteristics, details and advantages that are applicable will become clearer in the context of the explanatory discussion that follows, and which refers to the attached schematical drawings that are meant to serve as illustrations of the invention in two different configurations.

Figure 1:
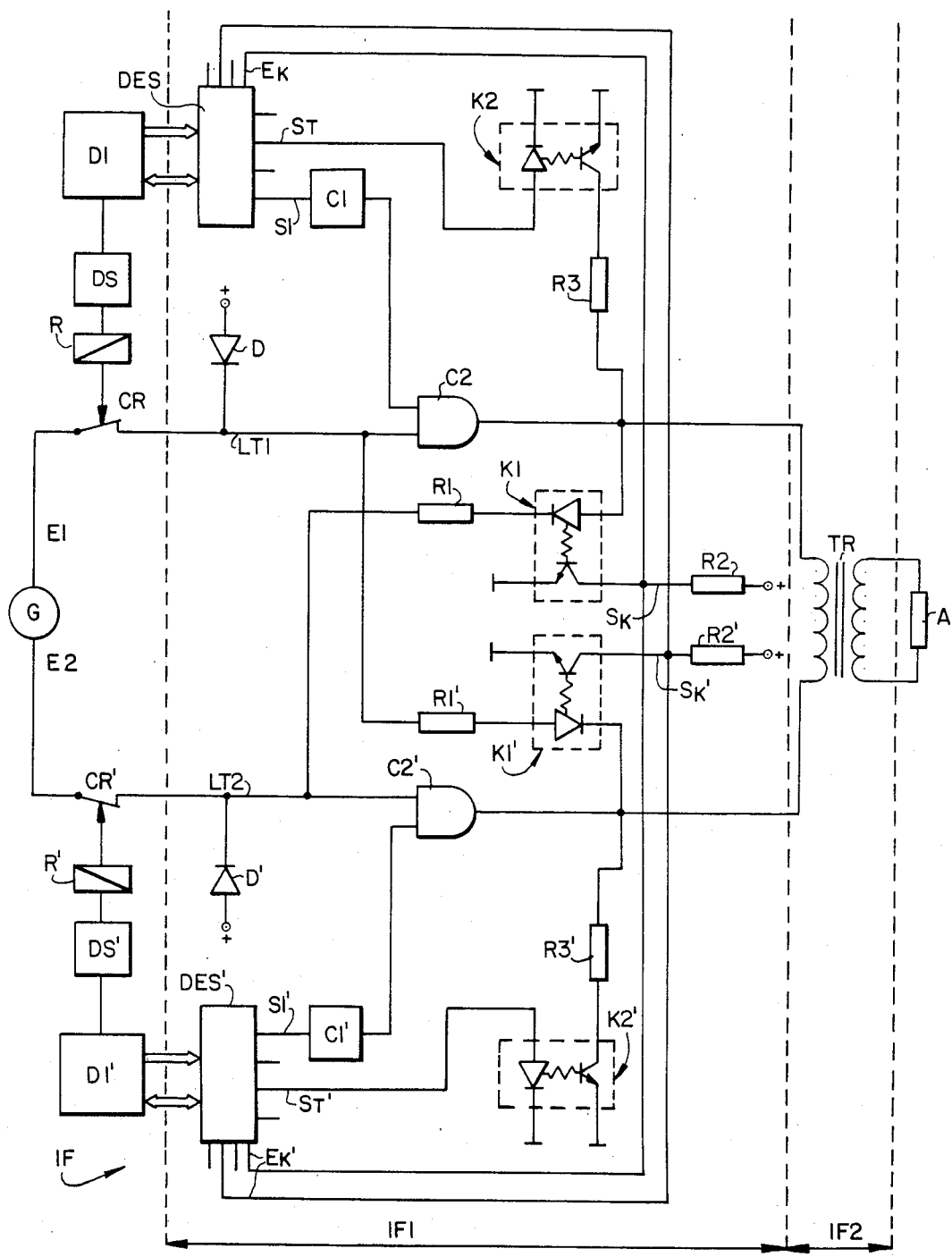
FIG. 1 shows the electrical diagram of the first configuration of the interface, according to this invention.

FIG. 1 shows the first configuration of the interface according to this invention. In the illustrated example are D1 and D1' which are two computer modules, and an activator A which is fed electric power from a generator G which produces two different power levels E1 and E2, each one of which is transmitted to the activator A by means of power transmission lines LT1 and LT2. The interface is identified by the reference IF. According to this invention, the above-described interface consists of two parts: a part labeled IF1 which forms that part of the interface which has externally controlled security meachanisms, and a part labeled IF2 which has intrinsic, or built-in security mechanisms.

The interface has, for each computer module D1 and D1' an input/output mechanism labeled DES and DES', which consists of such elements as coders, decoders and output registers. Each one of these mechanisms DES and DES' has a certain number of outputs labeled Si. In FIG. 1 a single output S1 is used for sending commands to the power circuit that feeds the activator A. Of course, it would be possible to use other outputs for sending commands to the power circuits of other activators. The outputs S1 and S1' are respectively tied to inputs on control units C1 and C1', the outputs of which in turn are connected to respective inputs of switching units C2 and C2'. The switching units C2 and C2' also have inputs connected to the power circuit of the activator, i.e., to the power transmission lines LT1 and LT2, respectively. Each of these switching units C2 and C2' assures the transfer of electric power to the activator A in response to a command signal issued from the command units C1 and C1'. It is observed that these switching units C2 and C2' are performing AND logic functions. They consist of discrete electrical components such as transistors and other semiconductor parts or sub-assemblies.

From the outputs of switching units C2 and C2', the power transmission lines LT1 and LT2 are connected to respective inputs of the primary winding of a transformer TR. The activator A is connected in the secondary winding circuit of the same transformer.

In order to monitor the functioning of switching units C2 and C2', two monitoring units K1 and K1' are provided, each having an input circuit connected between the output of a corresponding one of the switching units C2 and C2' and the power transmission line receiving input of the other one of the switching units, as shown. The outputs Sk and Sk' of the units K1 and K1' are tied to respective inputs Ek and Ek' of the two modules DES and DES'. The monitoring units K1 and K1' can be assembled in any one of several ways. In the present example they consist of photocoupler circuits the inputs of which are equipped with resistors R1 and R1' which are in turn tied to the two power transmission lines LT2 and LT1, respectively. The output circuits of these photocouplers include respective resistors R2 and R2', and are connected between ground and a positive voltage level.

The interface according to the present invention further includes test units K2 and K2', which are meant to monitor the functioning of control units K1 and K1', respectively. The respective inputs of test units K2 and K2' are tied to corresponding test outputs St and St' of the modules DES and DES'. The respective ouputs of test units K2 and K2' are connected through associated resistors R3 and R3' to the outputs of switching units C2 and C2', respectively, and the corresponding monitoring units K1 and K1'. To complete the test circuit of each unit K1 and K1', the input circuits of the units K1 and K1' are, by way of the corresponding power transmission lines LT2 and LT1, connected to a positive voltage source by diodes D and D', respectively.

In addition to the security measures that have just been described, the circuit of FIG. 1 includes system security modules DS and DS' for computer modules D1 and D1' respectively. These modules are termed "watchdogs" and act upon corresponding relays R and R', which can be built-in security relays that insure the opening of associated relay contacts CR and CR' mounted in the power transmission lines LT1 and LT2, in response to command signals sent from the corresponding computer modules D1 and D1'.

The system represented in FIG. 1 which has been described above functions as follows: the activator A, i.e., an electric motor, cannot be fed power unless a power level is applied to each of the inputs to the primary winding of the transformer TR, and each of these power levels is different from the other. In order for the power to reach the inputs of the transformer, the two switching units C2 and C2' have to be closed, i.e., allowing current to pass at the same time. In other words these two switches have to receive simultaneously at their command inputs appropriate signals from corresponding modules DES and DES' via command circuits C1 and C1'.

It will thus be appreciated that an order cannot reach the activator unless three conditions are met simultaneously (two power levels; different levels; two command signals). For security in operation, however, it is desirable that the inadvertent ocurrence of one or several of these conditions also be prevented.

The transformer TR is a primary means to protect the activator against such a risk, as will now be explained.

In practice, several activators each equipped with a power circuit that has switching units like units C2 and C2' would be controlled by a single module such as module DES. If the activators were simply connected across the outputs of their associated switching units, false triggering of one or more activators could occur under certain conditions. For example, it would be possible for a short circuit to occur between the outputs of switching units (more particularly, between the associated transmission lines connected to the ouputs) of two or more activator power circuits. The regular presence of a power level on the shorted transmission line of one activator would thus generate a power level in the line of the other activator (or activators) to which it is shorted, thus applying a false input signal to one input of the other activator (or activators). It would then only take the application of a power level to the remaining input of the other activator as a result of a normal command signal sent via the appropriate switching unit to turn on that activator. In other words, the activator would be turned on by a command from only one of the two associated computer systems, instead of both systems at the same time as contemplated in the design of the interface. A similar risk of false triggering would be presented by the inadvertent grounding of one of the power transmission lines connected to an input of an activator. In this case, the application of a power level to the remaining input could energize the activator.

This risk of inadvertently powering up an activator A in the manner described above is eliminated by inclusion of the activator in to the secondary winding circuit of a transformer TR, as shown in FIG. 1. With such a setup the activator will not be inadvertently turned on by a short circuit or the grounding of one of its inputs. It is still mandatory for all three of the security conditions mentioned above and required by the interface to be preliminarily fulfilled. Even a simultaneous grounding of the two activator inputs could, in the worst case, only cause a malfunction of the activator, which is not really considered a breach of security. Furthermore, the activator could not be turned on unless two different power levels were applied simultaneously to the two inputs to the transformer TR's primary winding. In view of all of the above explanations, the transformer can be considered, in accordance with this invention, as an intrinsic security constituent of the interface.

The monitoring units K1 and K1' allow for the detection, separately and at any given time, of the inadvertent presence of a power level beyond the outputs of the switching units C2 and C2'. A presence of this nature would place the entire security system in default. In particular the inadvertent and perhaps permanent power level at one of the outputs of one of the switching units C2 or C2' would results the activator being energized on command from the other switching unit C2' or C2, i.e., by means of only one computer system.

As can be seen from FIG. 1, the separate control for each power transmission line beyond the power circuit switching unit outputs is assured by the arrangement of the units K1 and K1' in the manner described earlier. If, for example, a power level were to be applied to the output of the switching unit C2, the monitoring unit K1, consisting of a photocoupler, would cause a difference in power levels to be applied across the inputs of K1, which would in turn excite the photocoupler. This would produce a specific output signal at the output Sk, which would be transmitted to each of the two computer systems D1 and D1'—more specifically to their input/output modules DES and DES'. The computer system D1 could then determine if the state of output "1" represents an inadvertent power level or one that originated from a command signal it had sent to switching unit C2. In the other computer system D1', the output signal coming from unit K1 is used to inhibit the transmission of a command signal to the switching unit C2' as long as an inadvertent power level is present beyond the output of the switching unit C2.

Another possibility is that the monitoring units K1 and K1' could be themselves defective. It would constitute a breach of the system's security if the defect in the control units prevented them from going to the "1" state from the "0" state, that is, from producing output signals even when there is a power difference applied across their input terminals. In such a case, one power level could be applied inadvertently to the output of one switching unit and the corresponding control unit would not be able to communicate this fact to the computer system of the other switching unit. Thus there would be no signal to prevent this latter computer system from sending a command signal to its switching unit, even through an inadvertent power level is applied to the output of the first-mentioned switching unit. The result would be the inadvertent powering of activator A upon receipt of a command from only one of the computer systems.

The purpose of test units K2 and K2' is to eliminate this risk. For this purpose, the units K2 and K2', which in the present example consist of photocouplers, are connected so that they can operate to test the control units K1 and K1' at any time. To this end the security interface according to this invention is equipped with a test circuit for each control unit K1 and K1' the test circuit utilizing a continuous current. If the unit K1 is to be tested, the module DES will generate a test signal at its St output that will close the output circuit of the photocoupler K2 and insure that a continous current will flow in the input circuit of the monitoring unit or photocoupler K1 across diode D'. If the control unit functions correctly, it will change states and thereby send an appropriate output signal to the computer systems.

It should be noted that in the example of the configuration that was just described and is shown in the figure, the test signals are constituted by a continuous current so that they will not influence the functioning of the system, i.e., cause an inadvertent activation of the activator. Of course, the test signals can consist of any type of arrangement as long as they meet this criterion.

This invention further includes security measures to effect an overall power cutoff if, for example, a default has already been detected and there is risk of a second default. It is for this eventuality that the security relays R and R' have been installed. Of course, a single relay could easily accomplish the same task. Whether one or two relays are used, the principle of security may be provided for without building redundance into the overall system.

These relays can be common to the entire installation regardless of the number of activators that are involved.

Figure 3:
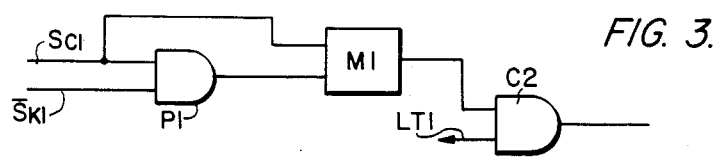
FIG. 3 shows a modification that applies to the configuration shown in FIG. 1.

It can be seen from FIG. 1 that the interface is configured for programmed logic. The same design principle can be used for an interface using hardwired logic. In this case, the assembly shown in FIG. 3 is interposed between the command unit C1 and the switching unit C2. The illustrative assembly includes an AND gate P1, with two inputs receiving respectively the command signal Sc1 from the command unit C1 and the signal $\overline{Sk1}$ from the monitoring unit K1, and a memory unit M1.

If the unit K1 produces a "0" output signal representing a "0" level at the output of switching unit C2 that is being controlled, the gate P1 will pass command signals that come from C1 to cause C2 to switch. In order to insure that even though the switching unit C2 changes state and blocks the gate P1, the signal from unit C1 will always reach unit C2, the unit M1 is provided to maintain the output of C2 in the "1" state while the command unit C1 sends a command signal.

Figure 2:
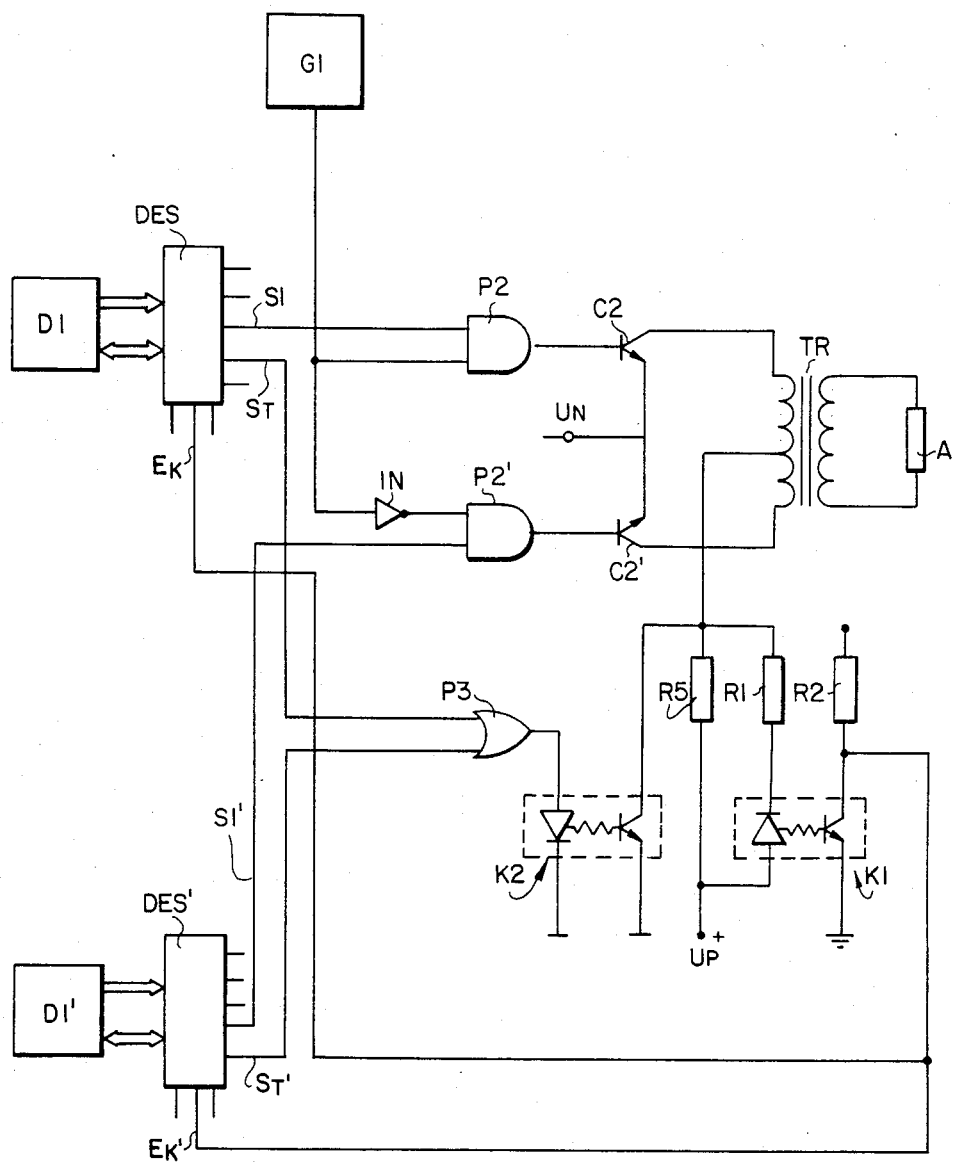
FIG. 2 shows the electrical diagram of the second configuration of this interface, according to this invention.

FIG. 2 shows a second configuration of an interface according to this invention. This configuration is based on the use of a transformer with a rectangular hysteresis curve.

In FIG. 2, all of the elements that correspond to the same elements already described for FIG. 1 carry the same references. The activator A is connected as before to the secondary circuit of a transformer TR. However, a midpoint of the primary winding is now tied to positive voltage source Up by means of a resistor R5. The two inputs of the primary winding are respectively connected to the outputs of corresponding switching units C2 and C2', each of which in this case consists of a transistor. The emitters of the two transistors are tied to a negative voltage source Un. The base of each transistor C2 and C2' is commanded by a module DES or DES' by means of an associated AND gate P2 and P2'. AND gates P2 and P2' have first inputs respectively connected to the S1 and S1' outputs of the modules DES and DES', and second inputs connected to the output of an impulse generator G1. Regarding the gate P2', it is observed that an inverter IN is placed between the output of generator G1 and the corresponding gate input. In this configuration, only one monitoring unit K1 is needed to track the output states of the switching units C2 and C2'. The control unit can be configured any number of ways. In the present example shown in FIG. 2, it consists of a photocoupler such as was described for FIG. 1, the input of which is connected to resistor R5. The output Sk of this photocoupler is connected to each of the two modules DES and DES' by means of respective input terminals EK and EK'. Connected to module K1 is a test module K2 as in the case shown in FIG. 1. The purpose of this test module is to monitor the function of module K1. The input circuit of the test module includes an OR gate P3 with two inputs tied respectively to the test outputs St and St' of the two modules DES and DES'.

The interface shown in FIG. 2 functions as follows: It is observed that each transistor C2 or C2' is conducting current when its input gate P2 or P2' is open (i.e., passes a signal). Each of the gates P2 and P2' opens when a positive impulse is received at its input connected to generator G1 simultaneously with the arrival of a command signal transmitted by its corresponding module DES or DES'. Given that the impulses produced by generator GI, before arriving at transistor C2' pass through an inverter IN and undergo a change in polarity, the transistor C2' is open while transistor C2 is closed and vice versa. As a result, the two halves of the primary winding of transformer TR undergo successive current flows that are in the opposite direction to current generated by the positive voltage source Up towards the negative voltage source Un at a frequency that is determined by that of the impulses from generator C1. This permits the activator A to receive power.

If one of the two transistors C2 and C2' is closed (off) because its module DES or DES' has not sent a command signal, or is constantly open (on) inadvertently due to a default, no current will flow continuously. Because of the rectangular hysteresis curve of the transformer TR, this latter remains insensitive to such states, and does not cause the activator A to receive power. Because a default state is characterized by current flowing in the corresponding primary winding half and therefore across resistor R5, this state will be detected by the control module K1, which will then signal the two modules DES and DES'. This will allow for inhibiting the transmission of a command signal to the other switch, which might cause an inadvertent powering up of activator A in conjunction with parasitic phenomena (in the circuit). As in the first configuration, in order to test the control module K1, one or the other of the modules DES or DES' sends an appropriate test signal. In the present example, a negative voltage with respect to source Up is applied to the free terminal of resistor R5, which causes the "1" state to appear the output of the control module K1. It would be possible as an alternative to disconnect the module K1 from the resistor R5 as appropriate for the duration of the test. It would also be possible to choose a different test signal than that of the operating current of the system, to which this latter is insensitive. Another very easy method to verify the function of monitoring module K1 when there is a "1" state permanently at the output of this module, would consist of causing the output of one of the modules DES or DES' to pass to the "0" state for a couple of milliseconds, or even microseconds, and then to read to information coming back from the module K1. Given that the response times of the elements in the activator module are comparatively long, the activator will remain insensitive to such a brief state change.

It is observed that in the second configuration the three indicated conditions in the first configuration still need to be met simultaneously: two power levels Up and Un are needed; the two levels must be different; and two simultaneous command signals from the modules DES and DES' are needed.

Of course, there are several modifications that can be adapted to the configurations that have been described above. It is possible to make the interfaces more complex by incorporating other units capable of generating logic functions, and to which it would then be necessary to add control modules and other means to allow verification of proper functioning of these modules. In the case of the first configuration, it is possible to divide the interface represented in FIG. 1 into two parts, that is to have only one switching unit hooked up to a power transmission line. In the case of the second configuration it is possible to design the interface not as a programmed logic circuit, but as a hardwired logic circuit using elements analogous to those in the layout shown in FIG. 3. Furthermore, the different modules can be assembled in other ways in order to perform the indicated functions.

In all cases, an adapter module for the output voltage as well as a filter module or rectifier module can be interposed between the transformer TR and the activator A.

It should be further noted that in the case of the two configurations presented in FIGS. 1 and 2, the monitoring units K1 and K1' can be separated into single units, so that the signals sent to the computer modules are mutually isolated. This will allow for limiting the risk of interaction between the two computer systems.

I claim:

1. Apparatus for driving an activator module under control of a computer system, said apparatus comprising:

power circuit means for energizing said activator module, including first and second power transmission line means for transmitting power from an electrical power source to said activator module with different voltage levels on the respective power transmission line means, switching means including first switch means capable of performing an AND logic function for closing and opening said first power transmission line means in response to command signals applied to command input means of said first switch means in order to engage and disengage said power source from said module, command signal applying means including first command module means having output means connected to said command input means of said first switch means and having input means connected to said computer system for applying said command signals to said command input means of said first switch means, monitoring means including first monitoring module means having an input circuit connected to a section of said first power transmission line means which is switchably connected to said power source through said first switch means and having an output connected to said first command module means for monitoring power signal level states on said section of said first power transmission line means and for providing an output indicative of said states to said first command module means, and test means connected for applying a test signal to said first monitoring module means, said first command module means including comparator means for comparing a monitored power signal level state on said section of said first power transmission line means, as indicated by said output of said first monitoring module means, with a command state of said first command module means and including inhibiting means for preventing the application of a command signal to said command input means of said first switch means when the compared states do not agree.

2. Apparatus in accordance with claim 1, wherein said input circuit of said first monitoring module means is sensitive to an "on" state.

3. Apparatus in accordance with claim 2, wherein said input circuit of said first monitoring module means is connected between said section of said first power transmission line means and a reference voltage level.

4. Apparatus in accordance with claim 1, wherein said test signal applied by said test means simulates an "on" state on said section of said first power transmission line means.

5. Apparatus in accordance with claim 4, wherein said test means has a control input connected to said first command module means.

6. Apparatus in accordance with claim 1, wherein said switching means includes second switch means capable of performing an AND logic function for closing and opening said second power transmission line means, wherein said command signal applying means includes second command module means having input means connected to the computer system and output means connected to command signal input means of said second switch means, wherein said monitoring means includes second monitoring module means having an input circuit connected to a section of said second power transmission line means which is switchably connected to said power source through said second switch means and an output connected to said second command module means, wherein said test means includes first and second test modules corresponding to said first and second monitoring module means and each having a test signal output connected to the input circuit of the corresponding monitoring module means, and wherein said second command module means has comparator means for comparing a power signal level state on said section of said second power transmission line means, as indicated by said second monitoring module means, with a command state of said second command module means and has inhibiting means for preventing application of a command signal by said second command module means when the last-mentioned compared states do not agree.

7. Apparatus in accordance with claim 6, wherein the outputs of said first and second monitoring module means are also connected to said second and first command module means, respectively.

8. Apparatus in accordance with claim 6, wherein said input circuit of said first monitoring module means is connected between said section of said first power transmission line means and a transmission line receiving input of said second switch means and wherein said input circuit of second monitoring module means is connected between said section of said second power transmission line means and a transmission line receiving input of said first switch means.

9. Apparatus in accordance with claim 6, wherein each of said monitoring module means and said test modules is a photocoupler.

10. Apparatus in accordance with claim 1, wherein said activator module is connected to the secondary winding of a transformer and wherein said first and second transmission line means are connected to inputs of a primary winding of said transformer.

11. Apparatus in accordance with claim 10, wherein said transformer has a rectangular hysteresis curve, wherein said first switch means includes first and second switches through which said first power transmission line means is alternately switched, and wherein said switches are connected to said primary winding of said transformer in such a manner that current of said first power transmission line means flows in opposite directions in said primary winding with the alternate switching of said first power transmission line means through said switches.

12. Apparatus in accordance with claim 11, wherein said switching means further includes first and second AND gates corresponding to said first and second switches, respectively, each of said AND gates having an output connected to a control input of the corresponding switch, an input connected to a corresponding command of said first command module means, and another input connected to an impulse generator, said another inputs of said first and second AND gates being 180° out of phase with one another.

13. Apparatus in accordance with claim 11, wherein said primary winding of said transformer has a midpoint connected to a source of a first voltage level and wherein said first and second switches are connected between corresponding terminals of said primary winding and a second voltage level different from said first voltage level.

14. Apparatus in accordance with claim 13, wherein said input circuit of said first monitoring module means is connected between said source and said midpoint of said primary winding.

15. Apparatus in accordance with claim 14, wherein said test means includes a test module having an output circuit connected between said midpoint of said primary winding and a reference voltage level different from said first voltage level.

16. Apparatus in accordance with claim 15, wherein said first monitoring module means is a photocoupler and wherein said test module is a photocoupler.

17. Apparatus in accordance with claim 14, wherein said test means is adapted to interrupt the sending of a command signal for a short time period relative to the response time of said activator module in order to test said first monitoring module means.

18. Apparatus in accordance with claim 1, wherein said first command module means is connected to said command input means of said first switch means by way of a logic module, said logic module including an AND gate having one input connected to said first command module means and another input connected to the complement of the output of said first monitoring module means, said logic module further including memory means, having two inputs connected respectively to an output of said AND gate and to said first command module means and having an output connected to said command input means of said first switch means, for maintaining at "1" state at said command input means of said first switch means during application of a command signal by said first command module means.

* * * * *